United States Patent [19]

Kurosaki

[11] 4,040,615

[45] Aug. 9, 1977

[54] ORIGINAL DISCHARGING DEVICE FOR COPIERS

[75] Inventor: Takefumi Kurosaki, Isehara, Japan

[73] Assignee: Rank Xerox Ltd., London, England

[21] Appl. No.: 709,143

[22] Filed: Aug. 16, 1976

[30] Foreign Application Priority Data

Sept. 21, 1975  Japan .............................. 50-109984

[51] Int. Cl.² ...................... B65H 29/32; B65H 29/48
[52] U.S. Cl. .................................. 271/63; 214/1 BV;
214/6 FS; 271/83; 271/194; 355/76
[58] Field of Search ................. 271/63, 264, 194, 267,
271/83, 84, 85, 107; 355/76, 75; 214/1 BV, 6 FS

[56] References Cited

U.S. PATENT DOCUMENTS

| 1,692,597 | 11/1928 | Vicum | 271/83 |
| 3,944,366 | 3/1976 | Robertson | 355/76 |
| 3,988,065 | 10/1976 | Mileski et al. | 355/75 X |

Primary Examiner—Bruce H. Stoner, Jr.

[57] ABSTRACT

A document discharging device for discharging copied documents from the platen of a copying machine wherein vacuum members are provided in the platen cover to lift the copied document from the platen as the cover is raised, guide arms being provided to guide the lifted document into a discharge tray when the lifting vacuum is shut off.

2 Claims, 4 Drawing Figures

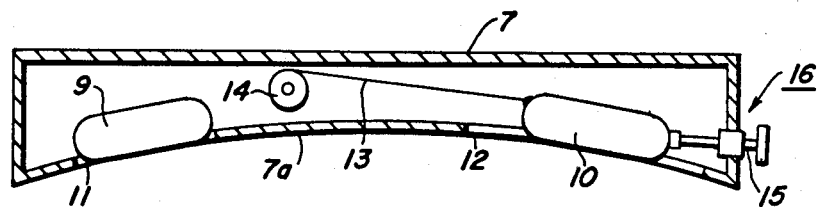
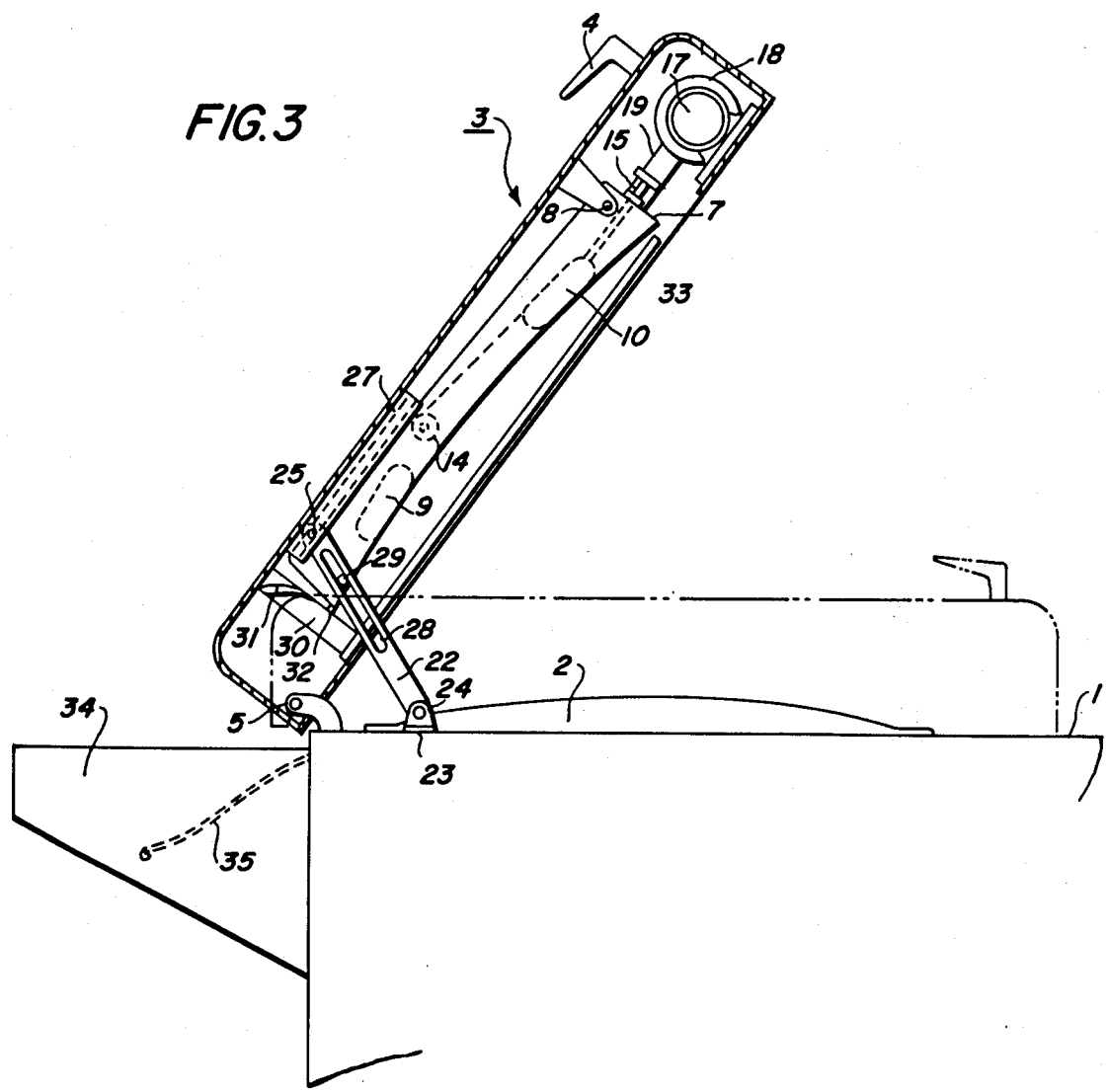

ORIGINAL DISCHARGING DEVICE FOR COPIERS

BACKGROUND OF THE INVENTION

The present invention relates to a discharge device for discharging an original document from the platen of a copier, particularly, a copier in which copy speed is relatively high, being capable of processing sheets of paper from 40 to 60 per minute.

Heretofore, in the copying operation by use of the copying machine of the type as described, an original is placed on an original carriage, ordinarily called a platen, and the original is then covered by a cover plate or platen cover after which a copy button is depressed for initiating the copying operation and after copying has been completed, the platen cover is released to discharge the original from the platen.

For this reason, when the copy speed becomes relatively high, for example, 40 to 60 copies per minute, the time required to discharge the original from the platen greatly influences the speed of the copying operation and in addition, the rapid shuffling of originals is both mentally and physically tiring.

To overcome these problems, an automatic original supply device and means for discharging an original by use of rollers and belts have heretofore been proposed. However, these conventional devices possess several disadvantages in that they are bulky, complicated, expensive and the devices may not achieve high speeds necessary to meet requirements because of the inertia of the mechanical elements thereof.

The present invention has been proposed in view of the above, and it is an object of the invention to provide an original discharging device for copiers, in which the platen cover is openable and of a small-type, inexpensive, and which can discharge originals in response to relatively high copying speed.

SUMMARY OF THE INVENTION

An original discharging device for copiers, wherein a platen cover is rotatably mounted above the platen of a copier, attraction members for attracting and supporting an original are mounted on the platen cover so as to face the platen original support and discharge guiding arms being mounted on the platen cover movable between a support and discharge guiding position and a housing position, characterized in that the arms, the platen cover, and the copier are so interrelated to one another that when the platen cover is rotated to a position where the platen is covered, the arms assume the housing position, whereas when the platen cover is rotated to a position where the platen is uncovered, the arms assume the support and discharge guiding position.

BRIEF DESCRIPTION OF THE DRAWINGS

FIG. 2 is a sectional view of an original pressing member;

FIG. 3 is a sectional view of the device of FIG. 1; and

DESCRIPTION OF THE PREFERRED EMBODIMENT

Figure 1:
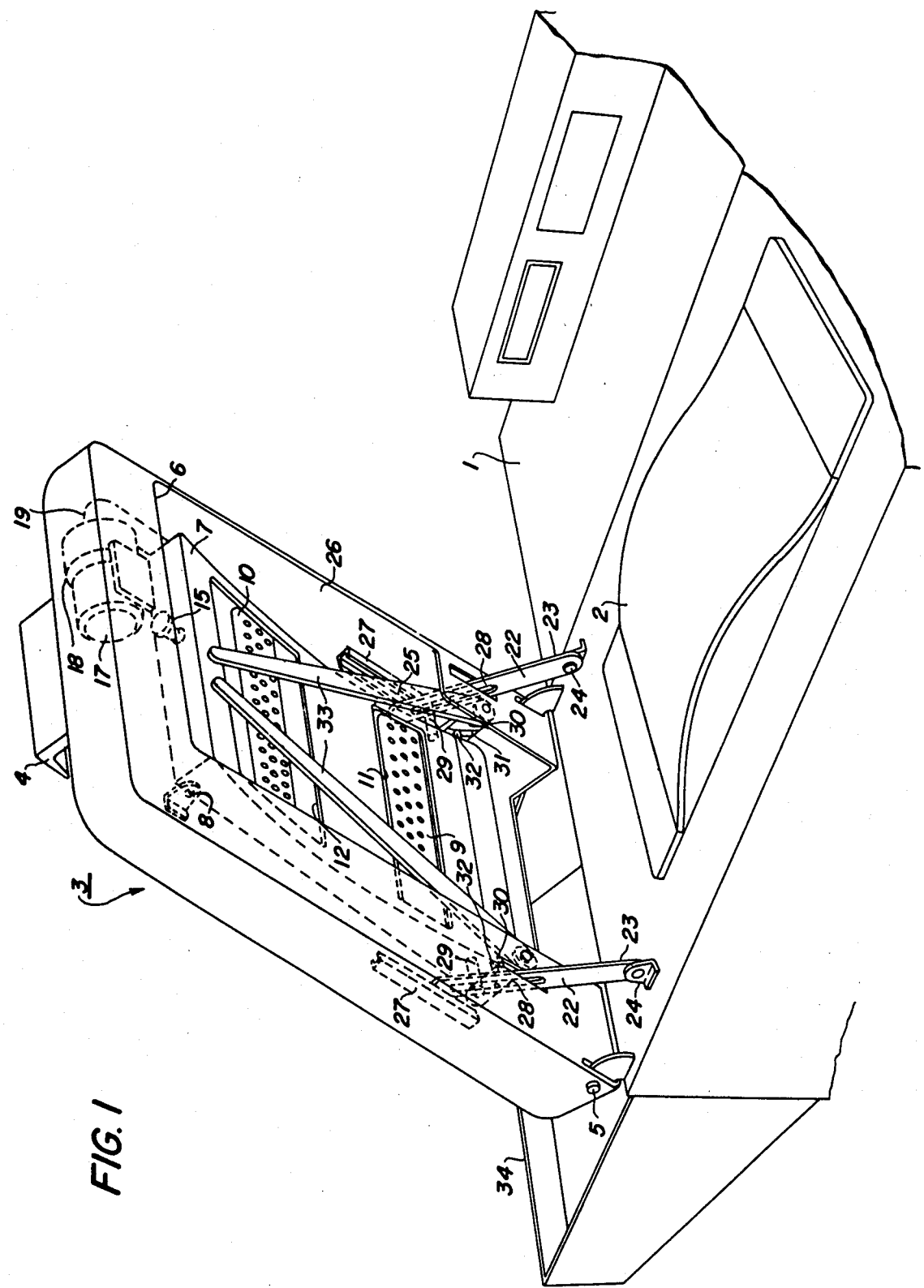
FIG. 1 is an overall perspective view of the present invention.
Figure 4:
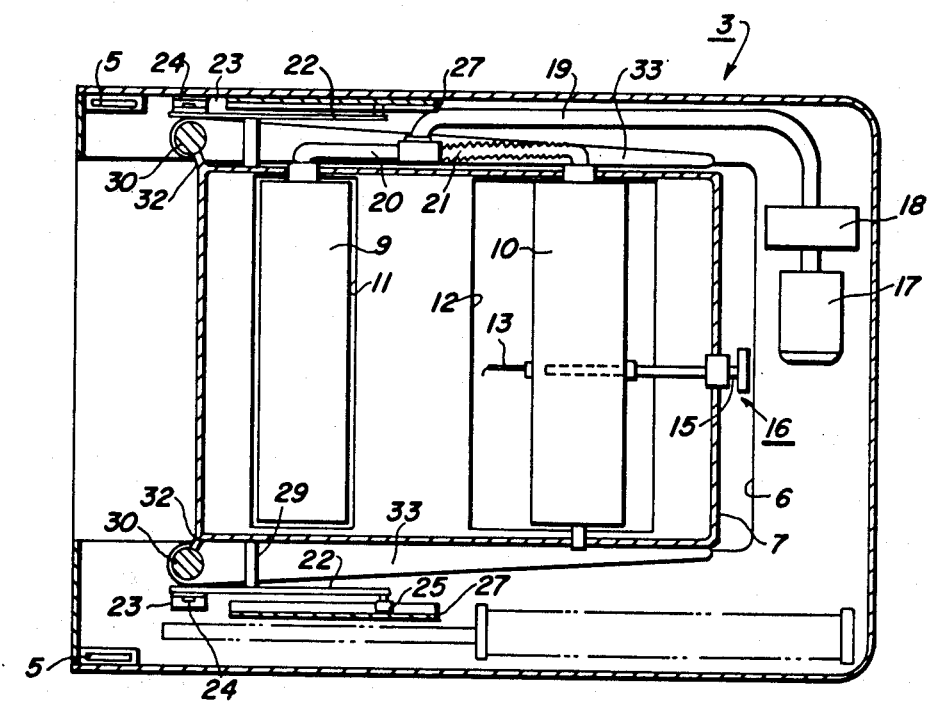
FIG. 4 is a cross-sectional view of FIG. 3.

Referring to FIG. 1, there is illustrated a condition where a device according to the present invention is arranged in the vicinity of a platen 2 of a copier 1, and a platen cover 3 is manually rotated to an open state so as to place an original and at the same time to discharge the already copied original.

The platen cover 3 has a handle 4 and is pivotally mounted on a pin 5 located in the vicinity of platen 2 of the copier 1 to allow the cover 3 to rotate between a position wherein the platen 2 is covered and a position wherein the platen 2 is uncovered.

The platen cover 3 has a recess portion 6 inside thereof, which is interiorly provided with an original pressing member 7 pivotable up and down on a pin 8, the original pressing member 7 having an internal surface 7a whose curved surface comes into intimate contact with the platen 2, the original pressing member 7 further having hollow end portions provided with a first and a second attraction members 9 and 10 for sucking air to attract the original.

Generally, the platen 2 is provided with one corner which is utilized to register the position of an original, and hence, originals of various sizes are always placed so that one corner thereof is brought nearer to the one corner of the platen. For this purpose, the first attraction member 9 is fixed in a window 11, whereas the second attraction member 10 is movably disposed in a lengthy window 12 so that the position thereof may be adjusted in accordance with the original size. That is, the second attraction member 10 has a sheet member 13 such as white rubber secured thereto, the other end of which is passed over a winding device 14 located interiorly of a hollow portion of the original pressing member 7, the winding device 14 being always biased by means of a spring or the like in the winding direction. A threaded lever 15 secured to the second attraction member 10 is screwed into the platen cover 3 to form a moving device 16 so that the second attraction member 10 may be moved along the lengthy window 12. The threaded lever 15 of the moving device 16 is adapted for operation by an operator and therefore, the platen cover 3 is preferably provided with a suitable access opening.

There is also shown a motor 17 mounted on the platen cover 3 which is actuated by a suitable switch (not shown) when the operator holds a handle 4 to rotate the platen cover 3 to its open position, to thereby drive a blower 18. The blower 18 has a suction pipe 19 connected to the first attraction member 9 through a pipe 20 and connected to the second attraction member 10 through a flexible pipe or a slidably expandable pipe 21.

A pair of left and right oscillating levers 22 are pivotally mounted on the copier 1 through brackets 23 and pins 24, the oscillating levers 22 each having a pin 25 at the oscillation end, each pin 25 being slidably disposed on a pair of left and right rails 27 arranged on an internal surface 26 of the platen cover 3. Each oscillating lever 22 is formed with a slot 28 into which a pin 29, located at the oscillation end of the original pressing member 7, is fitted, so that when the platen cover 3 is rotated to its open position, the original pressing member 7 is oscillated toward the platen cover 3 (clockwise) with the aid of the oscillating levers 22, rails 27 and pins 25, 29. To prevent mechanical rattles in various elements, the pivot pin 8 of the original pressing member 7 is made in the form of a torsion bar, which is always urged clockwise.

Further, rotatably mounted at opposite ends at the base of the platen cover 3 are shafts 30, which are formed with spiral grooves 31, within which pins 32 mounted on both surfaces at the oscillating end of the original pressing member 7 are received so that when the original pressing member 7 is oscillated, the shafts 30 rotate.

In addition, the shafts 30 have original support and discharge guiding arms 33 secured thereto so that when the first and second attraction members 9 and 10 are released from their attraction by means of the arms 33, the original is not dropped onto the platen 2 but slid down into a tray 34 disposed on the side of the copier.

Within the tray there is provided a curved guide 35 and sheets of original are orderly received into the tray 34 along the guide 35.

In order to prevent mechanical rattles with respect to the arms 33, it is desirable that the shafts 30 be urged outwardly (in the direction opposite to the operating direction in which the original is guided) by a suitable spring means.

From the foregoing detailed description, it will be appreciated that when the platen cover 3 is rotated to its open position, the original on the platen 2 is attracted by the first and second attraction members 9 and 10 and rotates along with the original pressing member 7, and upon completion of rotation, a pair of arms 33 are rotated to the support and guide position and at the same time, the first and second attraction members 9 and 10 are released from their attraction, whereby sheets of original move along the arms 33 and are slidably dropped into the tray 34 for accommodation.

Accordingly, continuous copying operation may be performed by an operator while gripping the handle 4 with one hand and handling the originals with the other hand to thereby provide great copying efficiency and minimize physical fatigue.

Moreover, in the illustrated embodiment, the entire surface of the original is not attracted but only the opposite ends of the original are attracted by the pair of attraction members 9 and 10, and as a result, the device of the invention does not have the disadvantage normally encountered in processing thin original sheets wherein the air ports print through on the copy and make it difficult to obtain a good quality copy. Further, since the quantity of air required for attraction is small, the power source and blower size may be miniaturized, which is economical.

It will be noted that if a counter balance mechanism is provided on the platen cover 3, the rotating operation of the platen cover 3 may be relieved and copying may be commenced by a switch (not shown) at the time when the platen cover 3 is closed (which is a condition where the original is pressed and covered).

Though not illustrated in the embodiment, it has been found in experiment that in a case where a thin original is intended to be discharged, when the first and second attraction members 9 and 10 are released all at once, the original may become curled and as a result, is not dropped into the tray 34 smoothly. For this reason, in order to smoothly drop the original into the tray 34, the attraction of the attraction member (first attraction member 9) on the side wherein the original is dropped is first released, and after a lapse of short period of time the attraction of the attraction member (second attraction member 10) upwardly located is released.

While a platen 2 having a curved surface has been used in the illustrated embodiment, it should be understood that a platen having a plane surface may also be employed to obtain the same effect as the former. In addition, while the machine body 1, the platen cover 3, and the arms 33 have been connected through oscillating links 22, the pins 25, the rails 27, the slots 28, the pins 29, the shafts 30 and the spiral grooves 31 in the illustrated embodiment, it may also be designed so that the shafts 30 with the arms 33 integrally secured thereto and the pivot pins 5 of the platen cover 3 are cooperated through a link mechanism or the like, whereby rotation of the platen cover 3 causes the arms 33 to be rotated.

Since the present invention has the construction as previously mentioned, all that need be done for the discharge of original on the platen 2 into the tray or the like is to rotate the platen cover 3 to its open position.

From the above, it will be appreciated that the operation performed by an operator is simple and the speed of copying work can be enhanced.

Furthermore, the device of the invention provides a construction wherein the platen cover 3 for covering the platen 2 is provided with the attraction members 9 and 10 and the arms 33, and accordingly, the device is small and inexpensive.

Moreover, since the original is automatically discharged by the opening operation of the platen cover, the original may securely be discharged in response to the operation of an operator even at a relatively high copying speed.

While the invention has been described with reference to the structure disclosed, it is not confined to the details set forth, but is intended to cover such modifications or changes as may come within the scope of the following claims.

What is claimed is:

1. An automatic document ejecting device adapted for incorporation in a platen cover of a copying machine having a platen glass for placement of documents to be exposed by the copying machine comprising:
    a pivotal cover overlying the platen glass, said cover being pivotable about an axis between a closed position adjacent the platen glass and an open position remote from the platen glass;
    vacuum plenum means mounted in said cover for attracting and supporting a document, said means being adapted to press the document against the platen glass when said cover is in said closed position; and,
    discharge guiding means moveably mounted in said cover for movement to a position under a document held by said vacuum plenum means responsive to movement of said cover to said open position to support and guide the document from said cover when the vacuum is shut off from said vacuum plenum means, said guide means being moveable to a position alongside the document position responsive to movement of said cover to said closed position.

2. An automatic document ejecting device according to claim 1 wherein said discharge guiding means comprise guide arms pivotally mounted on said cover; and, pin and slot means interconnected to said guide arms and said cover to move said arms under a document when said cover is pivoted to said open position and to move said arms free of the document area when said cover is pivoted to said closed position.

* * * * *